United States Patent
Smith

(10) Patent No.: US 7,819,304 B2
(45) Date of Patent: Oct. 26, 2010

(54) SOLID BRAZED LAMINATE STRUCTURES

(75) Inventor: Patrick Smith, Birmingham, MI (US)

(73) Assignee: Commando Lock LLC, Troy, MI (US)

( * ) Notice: Subject to any disclaimer, the term of this patent is extended or adjusted under 35 U.S.C. 154(b) by 694 days.

(21) Appl. No.: 11/690,213

(22) Filed: Mar. 23, 2007

(65) Prior Publication Data

US 2007/0221707 A1 Sep. 27, 2007

Related U.S. Application Data

(60) Provisional application No. 60/785,332, filed on Mar. 23, 2006.

(51) Int. Cl.
*B23K 35/12* (2006.01)
*E05B 67/22* (2006.01)

(52) U.S. Cl. .................. 228/245; 228/101; 70/38 A; 70/52; 70/20

(58) Field of Classification Search .......... 228/245, 228/101; 29/893, 893.3, 893.37; 74/445; 70/38 A, 52, 20
See application file for complete search history.

(56) References Cited

U.S. PATENT DOCUMENTS

| | | | |
|---|---|---|---|
| 2,236,291 A | | 3/1941 | Kilbourne |
| 2,259,271 A | * | 10/1941 | Seay, Jr. ............. 70/38 A |
| 2,512,351 A | * | 6/1950 | Lynn ............. 310/216.057 |
| 2,891,181 A | | 6/1959 | Atchley |
| 5,337,626 A | * | 8/1994 | Everts et al. ............. 74/445 |
| 5,626,211 A | * | 5/1997 | Gewelber et al. ...... 188/218 XL |
| 5,983,757 A | * | 11/1999 | Blise et al. ............. 81/57.39 |
| 6,334,373 B1 | * | 1/2002 | Hsieh ............. 81/60 |
| 6,561,945 B2 | * | 5/2003 | Shattuck et al. ............. 475/331 |
| 6,757,975 B1 | * | 7/2004 | Todd et al. ............. 29/893.33 |
| 6,759,782 B2 | | 7/2004 | Smith, Jr. |

* cited by examiner

*Primary Examiner*—Roy King
*Assistant Examiner*—Michael Aboagye
(74) *Attorney, Agent, or Firm*—Carlson, Gaskey & Olds PC

(57) ABSTRACT

An example method of manufacturing a solid brazed laminate structure includes stacking a first lamina on a second lamina with an interfacial spacing between them, aligning mating portions of the first lamina and the second lamina, and introducing a braze material at least partially into the interfacial spacing to join the first lamina and the second lamina together. One example solid brazed laminate structure includes a lock assembly. Another example solid brazed structure includes a gear assembly.

11 Claims, 2 Drawing Sheets

SOLID BRAZED LAMINATE STRUCTURES

CROSS-REFERENCE TO RELATED APPLICATION

This application claims priority to U.S. Provisional Patent Application No. 60/785,332 filed Mar. 23, 2006.

BACKGROUND OF THE INVENTION

This invention relates to a laminate structure and, more particularly, to a method for manufacturing a solid laminate structure, such as a gear assembly and a lock assembly.

Laminate structures are commonly used to create solid metal assemblies, such as a gear or a lock. Generally, the structure is formed by stacking a series of lamina, such as thin sheets of metal, on each other to a desired configuration. The sheets of metal are then held together by a rivet or by a mating feature on each sheet. This method of manufacture is significantly faster than a machining or cutting operation that may be used instead to create a solid structure.

The prior art technique for holding lamina together has its drawbacks, however. The structure may not be as strong as a solid structure that is machined. Moreover, subsequent operations to the assembled laminated stack are limited because these operations may loosen the lamina thereby negatively affecting the structural integrity of the assembly. In addition, over time, the lamina may loosen, again impacting the strength of the solid structure.

Accordingly, there is a need for a method of fabricating a strong, machinable, solid laminate structure.

SUMMARY OF THE INVENTION

The present invention comprises a method of manufacturing a laminated structure as well as the laminated structure itself. The inventive method involves stacking a first lamina on a second lamina to create an interfacial spacing between them. A braze material is then introduced into the interfacial spacing. Heat is applied to the structure to melt the braze material. The braze material flows through the interfacial spacing and is then allowed to solidify, thereby creating a strong connection between the first lamina and the second lamina.

In addition, the first lamina may have a mating portion that provides an interference fit with a complementary mating portion of the second lamina. In this instance, the first lamina and the second lamina are stacked upon each other so as to align the mating portions together. The braze material is introduced into the interfacial spacing and melted by heat. The first lamina and the second lamina are thereby locked together by the brazing material and by the interlocking mating portions.

A laminated structure made in this way produces a solid structure significantly stronger than structures made from prior art laminating techniques. In addition, such a structure may be machined to create features, such as holes, on the structure to produce a final assembly that is quickly manufactured. For example, a padlock assembly can be constructed from the inventive technique. Lamina may be stacked together and brazed to produce a padlock body. The brazed body may be machined to create holes and chambers for the mechanisms of the lock, such as the shackle and key cylinder. To further bolster the structural integrity of the lock assembly, interlocking mating features may be provided on the lamina.

In addition, a gear assembly can be produced using the inventive technique. The gear assembly has lamina each shaped to have gear teeth. The lamina sheets are stacked and brazed. The lamina may also be interlocked with mating features.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
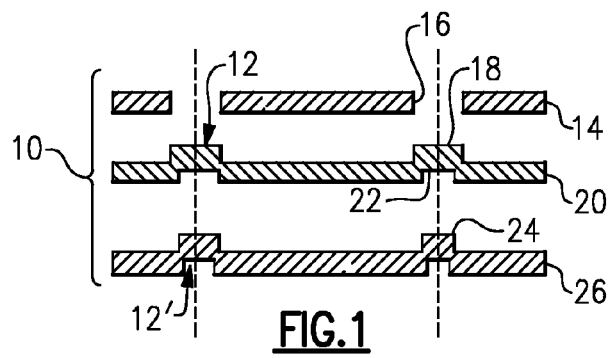
FIG. 1 schematically shows a step of manufacturing a solid brazed laminate structure, including aligning securing portions of a plurality of lamina.

FIG. 1 illustrates an example step for manufacturing a solid brazed laminate structure, such as is used for a padlock or a gear. The example method includes stacking a plurality of lamina 10 such that mating portions 12 of the lamina are aligned such as in a straight stacked configuration or a skewed configuration. In the illustrated example, a first lamina 14 includes an opening 16 that receives a tab member 18 of a second lamina 20. The second lamina 20 includes an opening 22 on the opposite side of the tab member 18 that receives a corresponding tab member 24 of a third lamina 26.

In the illustrated example, the plurality of lamina 10 are stamped from steel sheets into the configurations shown. Given this description, one of ordinary skill in the art will recognize other configurations and other types of mating portions to meet the needs of their particular application.

Figure 2:
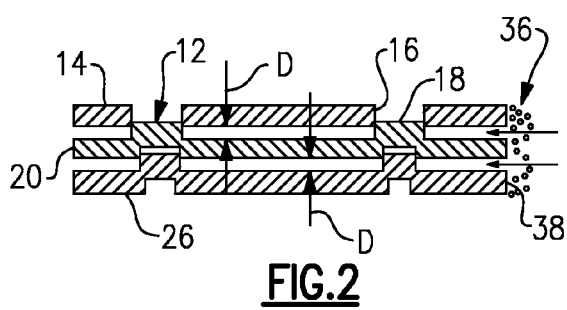
FIG. 2 schematically shows an example of manufacturing the solid brazed laminate structure including interlocking the plurality of lamina together.

After aligning the mating portions 12, the plurality of lamina 10 are pressed together to interlock the mating portions 12, as illustrated in FIG. 2. In the illustrated example, the tab member 18 of the second lamina 20 is received into the opening 16 of the first lamina 14. The size of the tab member 18 corresponds to the size of the opening 16 such that the tab member 18 fits tightly within the opening 16 so as to create a press fit. The tight fit between the tab member 18 and the opening 16 secures the second lamina 20 and the first lamina 14 together.

Likewise, the tab member 24 of the third lamina 26 is received into the opening 22 of the second lamina 20 to secure the second lamina 20 and the third lamina 26 together. Even under significantly high pressing pressures to interlock the mating portions 12, an interfacial spacing D remains between each of the plurality of stacked lamina 10. In one example, the interfacial spacing D is of sufficient size to promote a capillary effect during a brazing operation, as described below.

In the brazing operation, braze material 36, such as a braze paste, is introduced on the sides 38, such as the outermost edges of lamina 10, of the plurality of lamina 10 (FIG. 2) as shown. In one example, the braze material 36 includes a known braze filler, such as copper. The braze filler may also include other chemical elements to modify the braze characteristics of the braze material 36, such as braze material melting temperature, as known. It will be recognized that the braze material 36 may be applied to selected portions of the sides 38 of the plurality of lamina 10 or to all of the sides 38 of the plurality of lamina 10 based upon the needs of the particular application.

Figure 3:
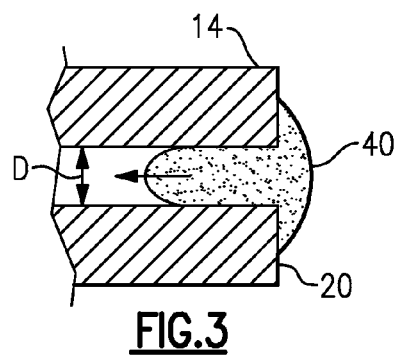
FIG. 3 shows an example of brazing a first and second lamina together.

After introducing the braze material 36 to the sides 38 of the plurality of lamina 10, the stack of plurality of lamina 10 and braze material 36 are heated to a temperature above a braze material melting temperature (e.g., in a furnace). In one example, an atmosphere of the furnace is controlled in a known manner to facilitate the brazing process. At the braze material melting temperature, the braze material 36 melts to form a liquid 40, as illustrated in FIG. 3. The plurality of lamina 10, however, do not melt at the braze material melting temperature. In the illustrated example, the plurality of lamina 10 are fabricated from a steel material having a melting temperature higher than that of the braze material 36.

Figure 4:
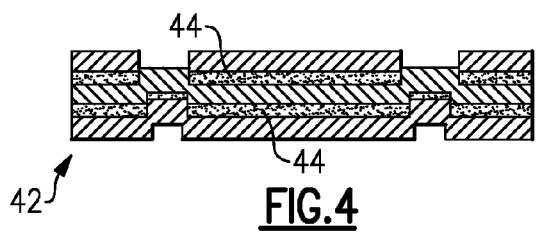
FIG. 4 shows an example of a solid brazed laminate structure.

The liquid braze material 40 is drawn into the interfacial spacing D, for example between the first lamina 14 and the second lamina 22 as illustrated in FIG. 3. A capillary effect draws the liquid braze material 40 into the interfacial spacing D. If the interfacial spacing D is too small, the capillary effect may be diminished and the liquid braze material 40 may not flow into the interfacial spacing D. With the capillary effect, the liquid braze material 40 flows throughout the interfacial spacing D between the first lamina 14 and the second lamina 22 and solidifies upon cooling of the plurality of lamina 10 to form a solid brazed laminate structure 42 illustrated in FIG. 4. The inventive technique may also be practiced without using the interlocking features, such as opening 22 and tab member 24. In other words, lamina may be brazed together without these features. Interfacial spacing D should be preserved, however, to promote spreading of liquid braze material 40.

The solid brazed laminate structure 42 includes the first lamina 14, the second lamina 22, and the third lamina 26 joined at brazed interfaces 44 between them. The brazed interfaces 44 once comprised the interfacial spacings D and now are filled with solidified braze material 36 from the brazing operation. In the illustrated example, the brazed interface 44 includes a substantially homogenous layer of the braze material 36 between the plurality of lamina 10. That is, the brazed interface 44 is essentially solid and contains few or no voids.

Figure 5:
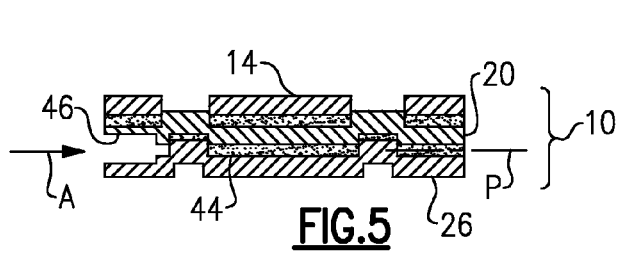
FIG. 5 shows an example of a machined opening within a solid brazed laminate structure.

One benefit of the disclosed method is that the solid brazed laminate structure 42 is strong enough to withstand machining after the brazing operation, while incurring little or no deformation, lamina spreading, or other physical damage from the machining. In one example, the solid brazed laminate structure 42 is subjected to a drilling operation to produce a machined opening 46, as illustrated in FIG. 5. The machined opening 46 is drilled into the solid laminate structure 42 along a direction A that is parallel to a plane P of the brazed interface 44. The brazed interfaces 44, which attach the plurality of lamina 10 together, are strong enough to withstand such machining operations. Previously known methods for joining lamina, such as riveting, welding or interlocking the lamina together using a central post, could not withstand such machining operations and would result in deformation or spreading apart of the plurality of lamina 10.

The disclosed example method of fabricating the solid brazed laminate structure 42 also provides the advantage of being able to form relatively complex solid shapes from lamina of varying shapes by stacking the lamina, securing the lamina together, and then brazing the lamina to further join them together as described above. Thus, an essentially solid body having a desired, relatively complex shape can be produced.

Figure 6:
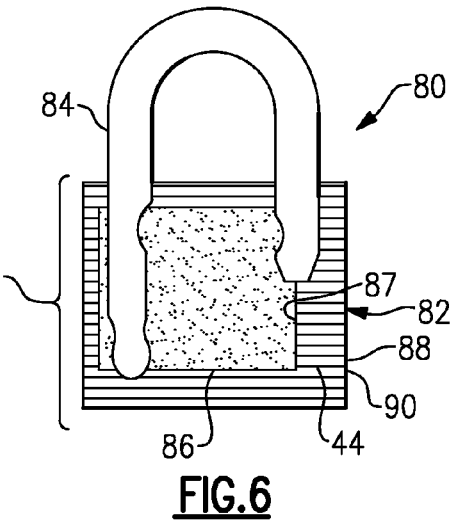
FIG. 6 shows an example of a padlock including a padlock body fabricated from a solid brazed laminate structure.

FIG. 6 illustrates another example apparatus benefiting from the use of a solid laminate structure 42. FIG. 6 illustrates a padlock 80 that includes a padlock body 82, a shackle 84, and a locking mechanism 86. The padlock body includes a cavity 87 that receives the locking mechanism 86. The locking mechanism 86 receives the shackle 84 and selectively secures the shackle 84. The padlock body 82 includes a plurality of lamina 10 stacked and secured together as described above for the examples in FIGS. 1-4.

Figure 7:
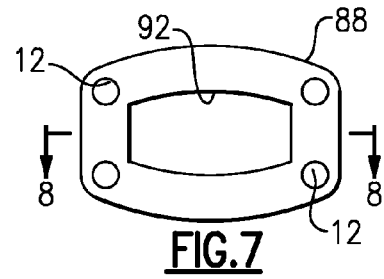
FIG. 7 shows a top view of an example of a lock plate used to assemble the pad lock body of the pad lock of FIG. 6.
Figure 8:
FIG. 8 shows a side view of the lock plate of FIG. 7.
Figure 10:
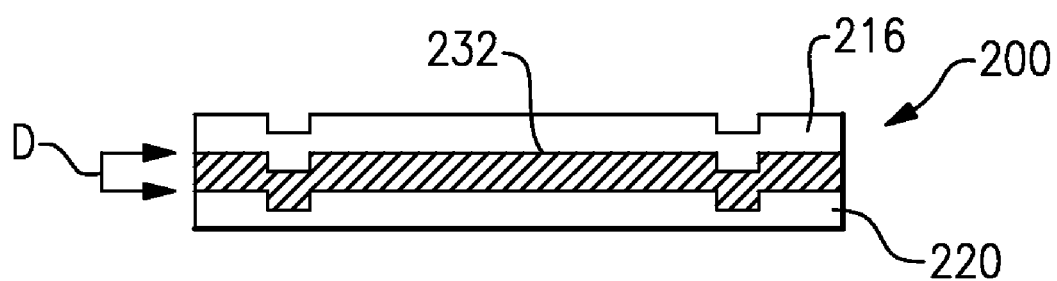
FIG. 10 shows a side view of the gear of FIG. 9.

FIGS. 7 and 8 illustrate one of the plurality of lamina 10, a lock plate 88. The lock plate 88 includes a plurality of mating portions 12, located in this example adjacent to the four corners of the plates, that interlock with corresponding mating portions 12 of an adjacent lock plate 90 (FIG. 10). The lock plate 88 includes an opening 92 that aligns with an opening of the adjacent lock plate 90 to form a portion of the cavity 87. As can be seen in FIG. 7, the openings 92 in the lock plates 88 and 90 include opposed curved sides and opposed straight sides for accommodating the locking mechanism 86.

Figure 9:
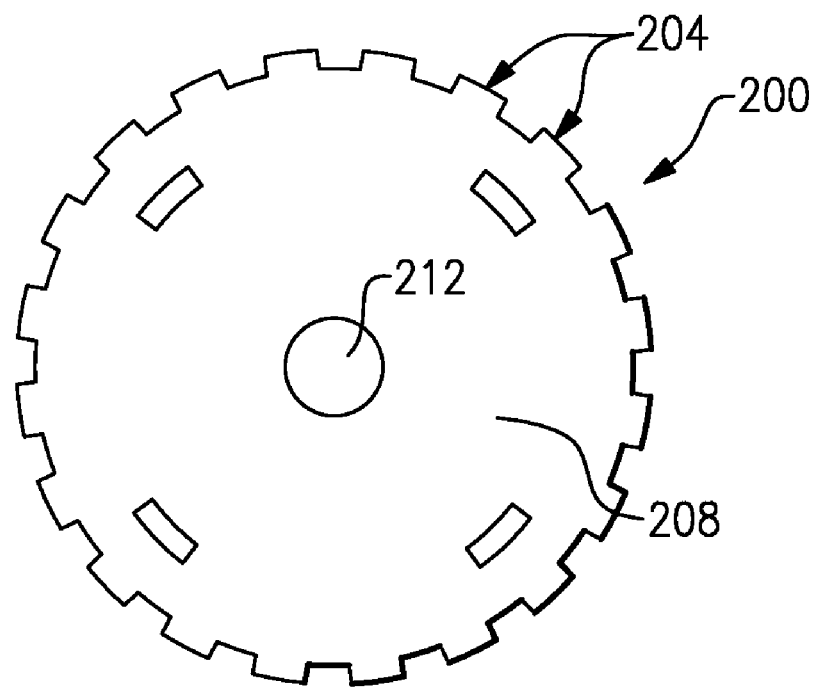
FIG. 9 shows an overhead view of a gear produced using the inventive technique.

FIGS. 9 and 10 illustrate another structure created by the inventive technique. Here, gear assembly 200 is shown. As shown, like machined gears, gear assembly 200 has teeth 204 extending circumferentially around gear body 208. Gear body 208 is provided with a hole 212 to rotate on a shaft as known. As shown in FIG. 10, gear assembly 200 is made up of at least first lamina 216 and second lamina 220, each having mating features such as tab 224, an indentation in gear body 208, and opening 228 sized to tightly receive tab 224. First lamina 216 and second lamina 220 form interfacial spacing D, which has brazed interface 232 formed as explained above.

While the inventive technique can be used to form a padlock 80 or a gear assembly 200, other solid structures may also be formed. These structures include a counterbalance, muffler flange, brake caliper, or any other solid structure formerly made by forging, powered metal, die casting, machining, or cutting. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A method of manufacturing a solid brazed laminate structure, comprising:
   (a) placing a first lamina adjacent to a second lamina with an interfacial spacing between the first lamina and the second lamina such that an opening in the first lamina aligns with an opening in the second lamina; interlocking plurality of tab members that are located adjacent to corners of the first lamina with four corresponding openings that are located adjacent to corners of the second lamina to secure the first lamina and the second lamina together;
   (b) introducing a braze material at least partially into the interfacial spacing;

(c) melting the braze material to form a liquid braze material;

(d) flowing the liquid braze material into the interfacial spacing; and (e) cooling the liquid braze material to join the first lamina and the second lamina together as at least a portion of a padlock body with the aligned openings at least partially forming a cavity for a padlock locking mechanism.

2. The method of claim 1 including the step of:
(f) aligning a first mating portion of the first lamina with a second mating portion of the second lamina.

3. The method as recited in claim 2, wherein step (f) includes securing the first mating portion to the second mating portion before step (b).

4. The method as recited in claim 1, wherein step (b) includes introducing the braze material to a side of the first lamina and a side of the second lamina.

5. The method as recited in claim 4, wherein step (d) comprises moving the liquid braze material from the side of the first lamina further into the interfacial spacing.

6. The method as recited in claim 1, wherein step (c) occurs without melting the first lamina or the second lamina.

7. The method as recited in claim 1, including the step of:
(g) machining at least one of the first lamina or the second lamina after step (e).

8. The method as recited in claim 1, including the step of:
(h) forming a hole in at least one of the first lamina and the second lamina after step (e).

9. The method of claim 1, including the step of:
(i) receiving the padlock locking mechanism and a shackle within the cavity formed by the aligned openings of the first lamina and the second lamina.

10. The method of claim 1, wherein each of the openings includes opposed curved sides and opposed straight sides.

11. The method of claim 1 including the step of:
(j) interlocking four tab members on the first lamina with four corresponding openings on the second lamina to secure the first lamina and the second lamina together.

* * * * *